UNITED STATES PATENT OFFICE.

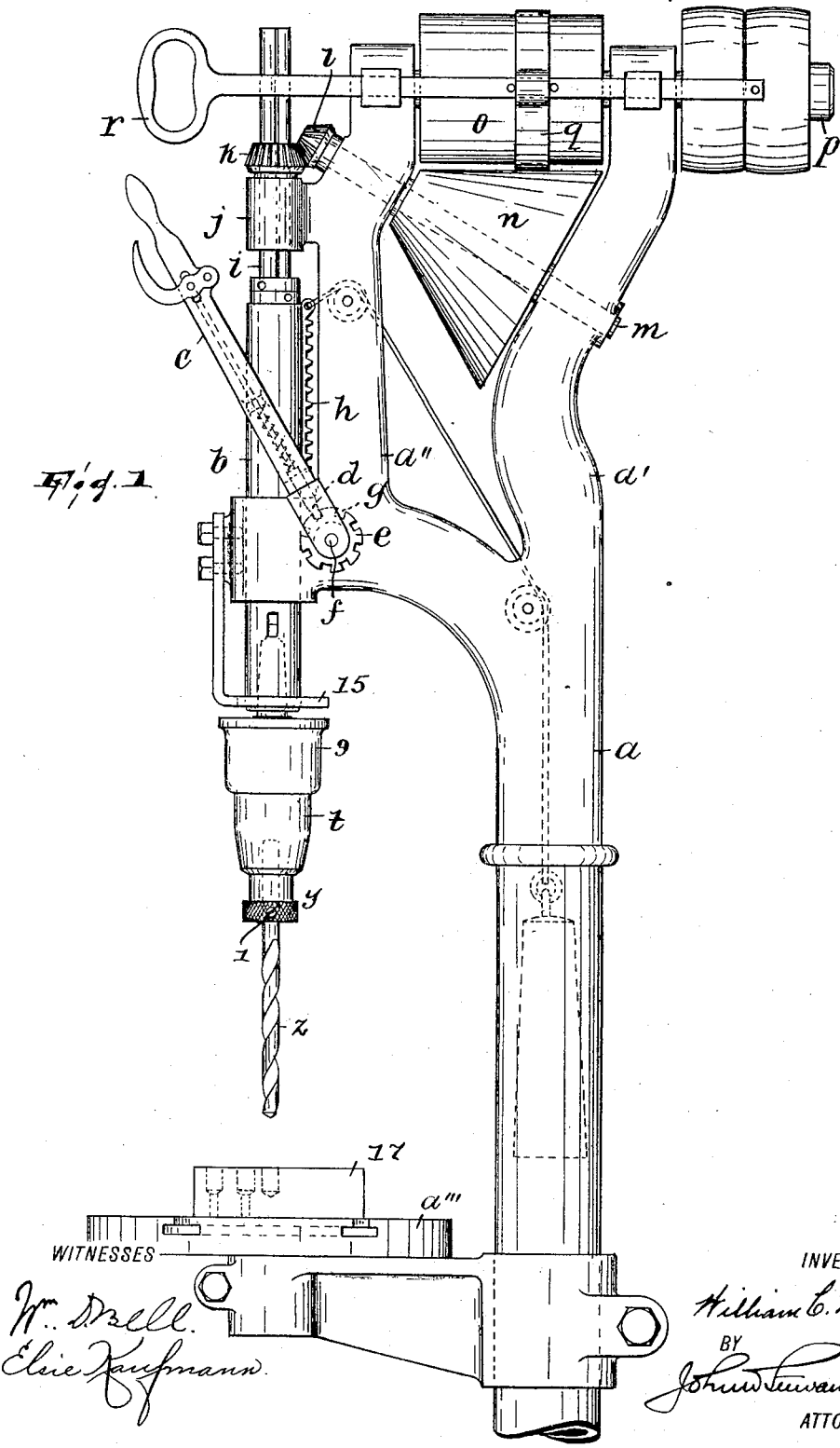

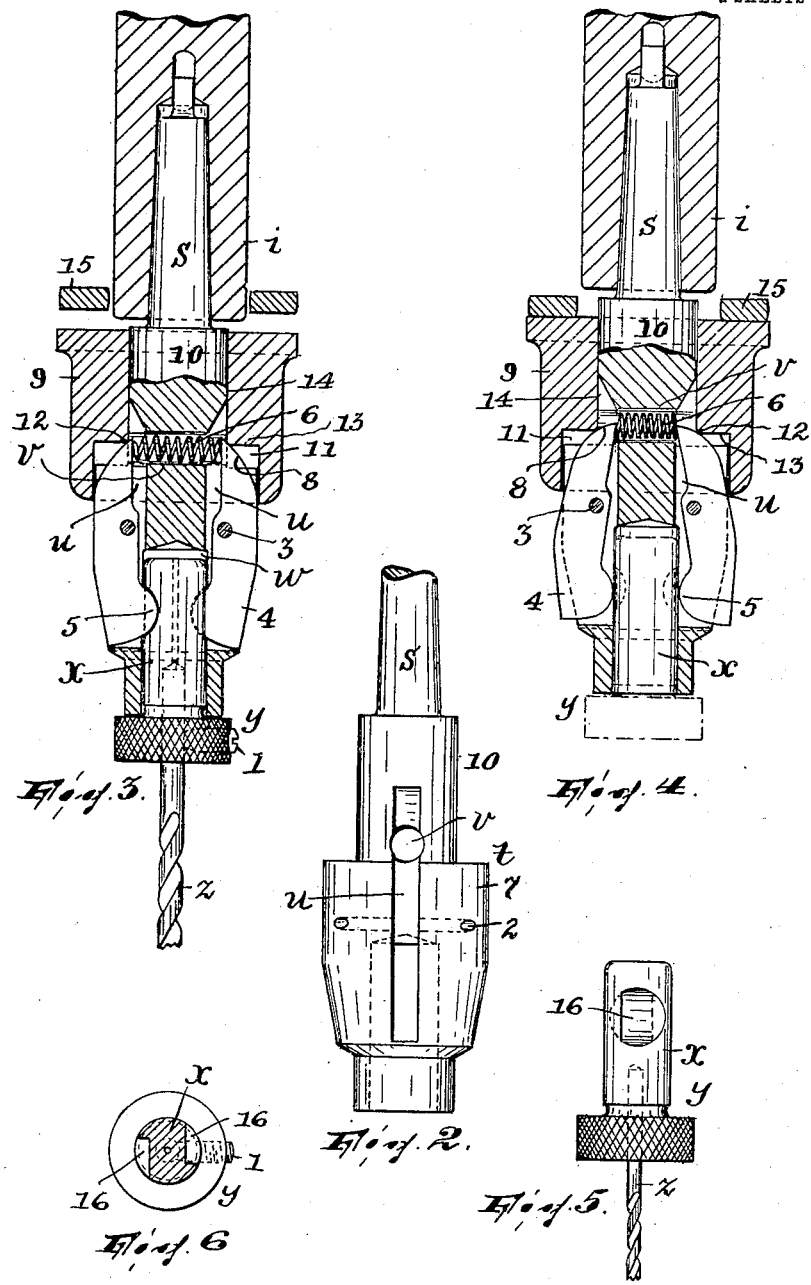

WILLIAM C. WHITNEY, OF HIGHLAND FALLS, NEW YORK, ASSIGNOR TO HIGHLAND FALLS MANUFACTURING COMPANY, OF HIGHLAND FALLS, NEW YORK, A CORPORATION.

DRILL.

938,534.          Specification of Letters Patent.      Patented Nov. 2, 1909.

Application filed January 2, 1909. Serial No. 470,403.

*To all whom it may concern:*

Be it known that I, WILLIAM C. WHITNEY, a citizen of the United States, residing in Highland Falls, Orange county, New York, have invented a certain new and useful Improvement in Drill-Chucks; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to drill presses and the like and it consists in certain improvements in mechanism of this character having for their object to make it possible to effect a change of tools without stopping the rotation of the chuck and thus losing time.

The invention will be found fully illustrated in the accompanying drawings, wherein, Figure 1 shows my invention applied in connection with a drill-press of known construction, the view being in side elevation; Fig. 2 shows the body of the chuck removed from the machine, the movable parts being detached; Fig. 3 shows the chuck, the chuck spindle and a chuck controlling part partly in side elevation and partly in section, the chuck being contracted; Fig. 4 is a view substantially similar to Fig. 2 except that the chuck is expanded; Fig. 5 is a side view of the tool; and, Fig. 6 a cross-sectional view thereof.

In one of two branches $a'$ $a''$ of the upright or standard $a$, having a suitable work-holder $a'''$, slides vertically in the usual manner the sleeve $b$, the vertical movements of which are effected from a lever $c$ having a manually controlled pawl $d$ adapted to engage a toothed wheel $e$ on the same shaft $f$ with a pinion $g$ which meshes with a rack $h$ carried by the sleeve. The spindle $i$, journaled in said sleeve and in a bearing $j$ of branch $a''$ of the standard $a$, has splined thereon a pinion $k$ meshing with a pinion $l$ fixed on the oblique shaft $m$ which is journaled in branches $a'$ $a''$ and carries a cone pulley $n$ that is driven from the pulley $o$ on the main shaft $p$, at differential speeds, by a belt $q$ surrounding pulley $o$ and interposed between the same and pulley $n$ and adapted to be shifted by the shipper-bar $r$. It will be understood that in lieu of this known mechanism for securing both a rotary and a vertical movement of the spindle any other mechanism may be employed. The lower end of spindle $i$ receives in the usual manner the shank $s$ of the body $t$ of the improved chuck which, in the present instance, has the opposed grooves $u$ connected by the bore $v$ at the upper ends thereof and opening into the main axial bore $w$ of said chuck body, the latter bore being adapted to receive the plug or stem $x$ of the holder-member $y$ of the tool, which latter preferably comprises said holder-member, the tool proper $z$ and a set-screw 1 for securing the tool-proper in the holder-member. I do not wish, however, to be limited to forming the tool in separate parts.

In holes 2 extending through the chuck body transversely of the grooves are arranged the pivoting pins 3 for jaws 4, each having on the inside of the lower end thereof a rounded projection 5 and its upper end opposite the bore $v$, in which latter is arranged a spiral spring 6 normally holding the jaws in the positions shown in Fig. 3. It may be remarked that the lower portion of the chuck-body, designated 7 in Fig. 2, is enlarged, the grooves $u$ extending somewhat above the shoulder 7' formed at the upper end of the said enlarged portion 7; in the normal position of the jaws they are substantially sheathed or inclosed in these grooves. The upper end-portion of each jaw, however, protrudes slightly above said shoulder 7', and this portion of each jaw has a cam-face 8 upwardly inclined to the surface of the reduced portion 10 forming the upper part of the chuck-body. A sleeve 9, substantially snugly fitting the said reduced part 10 of the chuck-body and having a downwardly open annular chamber 11 to receive and substantially snugly fit the enlarged part of said chuck-body, is vertically movable on the latter, resting with the edge 12 thereof, formed where the top surface 13 of chamber 11 and the surface of the bore 14 of the sleeve meet, in contact with the cam-faces 8, the part of said sleeve surrounding its chamber 11 acting to limit the outward movement of the upper ends of the jaws and the shoulder 7', in coaction with the surface 13 of chamber 11, acting to limit the downward movement of said sleeve. An abutment to be engaged by the sleeve 9, in the form of a fork 15, depends from and is bolted to the branch a'' of the standard, the same straddling the spindle. The holder-member y of the tool has the opposed notches 16 formed in its plug x by boring the plug tangentially in opposite directions. The fork 15 stands higher than the upward limit of movement of the spindle, under operation from lever c, when the latter is raised for the purpose of clearing the tool from the work 17. When it is desired to open the jaws 4 for the purpose of removing or inserting the tool, the lever c is moved farther than usual so as to raise the chuck until the sleeve thereof impinges against the fork 15; the sleeve being held from continued upward movement with the chuck, its edge 12 wipes over the cam-faces 8 of the jaws and turns them on their pivots, so that their lower or tool-holding ends open. On the return movement of lever c, spring 6 forces the jaws to their normal positions, the cam-faces 8 of the jaws acting to return the sleeve to its normal position.

Having thus fully described my invention, what I claim and desire to secure by Letters Patent is:

The combination of the chuck-body having a reduced upper part forming a shoulder with its lower or larger part, said chuck-body having a vertical groove extending from below the shoulder to a point above the same, a sleeve slidably arranged on the chuck body and snugly fitting the upper part thereof and having a downwardly open chamber receiving the upper portion of the lower part of the chuck-body, and a jaw pivoted between its ends in said groove and having its upper end protruding above said shoulder and formed in its protruding portion with a cam-face upwardly inclined to the surface of the reduced part of the chuck-body, said sleeve resting on the cam-face of said jaw, substantially as described.

In testimony that I claim the foregoing I have hereunto set my hand this 14th day of December, 1908.

WILLIAM C. WHITNEY.

Witnesses:
GEO. W. BLANCHARD,
ANNA W. BLANCHARD.